(12) United States Patent
Efstathopoulos

(10) Patent No.: US 9,787,719 B2
(45) Date of Patent: Oct. 10, 2017

(54) TRUSTED THIRD PARTY BROKER FOR COLLECTION AND PRIVATE SHARING OF SUCCESSFUL COMPUTER SECURITY PRACTICES

(71) Applicant: Symantec Corporation, Mountain View, CA (US)

(72) Inventor: Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 89 days.

(21) Appl. No.: 14/632,812

(22) Filed: Feb. 26, 2015

(65) Prior Publication Data
US 2016/0255113 A1 Sep. 1, 2016

(51) Int. Cl.
*H04L 29/06* (2006.01)

(52) U.S. Cl.
CPC .......... *H04L 63/20* (2013.01); *H04L 63/1433* (2013.01); *H04L 65/403* (2013.01)

(58) Field of Classification Search
CPC ..... H04L 62/20; H04L 63/20; H04L 63/0407; H04L 63/1408; H04L 63/1425; H04L 63/1433; G06F 21/6254
USPC .......................................................... 726/1
See application file for complete search history.

(56) References Cited

U.S. PATENT DOCUMENTS

| | | | |
|---|---|---|---|
| 6,807,569 B1 * | 10/2004 | Bhimani | G06F 21/577 705/44 |
| 7,339,914 B2 | 3/2008 | Bhagwat | |
| 7,536,723 B1 | 5/2009 | Bhagwat | |
| 8,091,114 B2 | 1/2012 | Lommock et al. | |
| 8,353,021 B1 * | 1/2013 | Satish | H04L 63/0263 709/202 |

(Continued)

FOREIGN PATENT DOCUMENTS

WO 2005/124622 A2 12/2005

OTHER PUBLICATIONS

Lincoln et al., Privacy-Preserving Sharing and Correlation of Security Alerts, USENIX, 2004.*

(Continued)

*Primary Examiner* — Minh Dinh
(74) *Attorney, Agent, or Firm* — Patent Law Works LLP

(57) ABSTRACT

A trusted third party broker collects information concerning successful computer security practices from multiple organizations, and privately shares collected information at an inter-organizational level. Information concerning empirically successful computer security practices is received from multiple source organizations. The information concerning empirically successful computer security practices received from the multiple source organizations is amalgamated and analyzed. Based on the analysis, specific information concerning empirically successful computer security practices is identified to share with specific target organizations. Once information to share with a target organization has been identified, any explicit and/or implicit source information that could identify the organization(s) from which the information originated is removed. The identified specific information concerning empirically successful computer security practices is then provided to the specific target organizations, with the source identifying information removed.

20 Claims, 4 Drawing Sheets

(56) References Cited

U.S. PATENT DOCUMENTS

| | | | |
|---|---|---|---|
| 8,516,552 B2 | 8/2013 | Raleigh | |
| 8,595,831 B2 | 11/2013 | Skare | |
| 8,683,598 B1* | 3/2014 | Cashin | H04L 63/20 713/188 |
| 8,769,696 B2* | 7/2014 | Pistoia | G06F 21/00 380/29 |
| 8,789,200 B2* | 7/2014 | An | G06F 21/6245 713/179 |
| 9,009,827 B1* | 4/2015 | Albertson | H04L 63/14 726/22 |
| 9,015,843 B2 | 4/2015 | Griffin | |
| 9,043,922 B1 | 5/2015 | Dumitras et al. | |
| 9,064,130 B1* | 6/2015 | Asheghian | G06F 21/6281 |
| 9,275,237 B2* | 3/2016 | De Cristofaro | G06F 21/60 |
| 2004/0109255 A1 | 6/2004 | Walz | |
| 2004/0210763 A1* | 10/2004 | Jonas | G06F 17/30477 713/193 |
| 2005/0102534 A1 | 5/2005 | Wong | |
| 2007/0240220 A1 | 10/2007 | Tuvell et al. | |
| 2008/0109473 A1 | 5/2008 | Dixon et al. | |
| 2008/0133531 A1* | 6/2008 | Baskerville | G06F 21/6254 |
| 2008/0271124 A1 | 10/2008 | Nisbet et al. | |
| 2010/0082803 A1 | 4/2010 | Nguyen | |
| 2011/0055925 A1 | 3/2011 | Jakobsson | |
| 2014/0373162 A1 | 12/2014 | Mahaffey et al. | |
| 2015/0244681 A1* | 8/2015 | Blumenfeld | H04L 63/0421 713/168 |
| 2015/0373040 A1* | 12/2015 | Sander | H04L 63/1425 726/22 |

OTHER PUBLICATIONS

Johnson et al. "Guide to Cyber Threat Information Sharing (Draft)." In: NIST Special Publication 800-150. Oct. 29, 2014 (Oct. 29, 2014). Retrieved from <http://csrc.nist.gov/publications/drafts/800-150/sp800_150 draft.pdf>.

International Search Report and Written Opinion for PCT/US2016/016752, mailed on Apr. 28, 2016, 11 pages.

International Search Report and Written Opinion for PCT/US2016/027937, mailed on Jul. 15, 2016, 10 pages.

* cited by examiner

TRUSTED THIRD PARTY BROKER FOR COLLECTION AND PRIVATE SHARING OF SUCCESSFUL COMPUTER SECURITY PRACTICES

TECHNICAL FIELD

This disclosure pertains generally to information technology administration, and more specifically to a trusted third party broker for the collection and private sharing of successful computer security practices.

BACKGROUND

In order to defend against threats to networks and other information technology (IT) infrastructure in the field, telemetry and other indicators of potentially malicious behavior can be collected from various sources and analyzed. By gleaning information concerning events that signify anomalous behavior from a wide range of sites, ongoing attacks can be detected and future attacks can be blocked proactively.

IT administrators of large enterprises could also benefit greatly from sharing intelligence regarding security best practices. For example, many intrusion detection systems (IDS) are constantly updated by experienced IT administrators with new rules capable of catching or defending against new types of threats. Collecting information concerning effective security best practices (so-called "positive telemetry") could provide a valuable resource for IT administrators, especially when shared among organizations in the same industry. However, organizations are reluctant to openly share/expose information regarding specific attacks directed against their infrastructure. Where organizations do not share such information concerning their own successful practices, IT administrators at other organizations have to "re-invent the wheel."

It would be desirable to address these issues.

SUMMARY

A trusted third party broker (e.g., on a central cloud based computer) collects information concerning successful computer security practices from multiple organizations, and privately shares collected information at an inter-organizational level. Information concerning empirically successful computer security practices is received from multiple remote computers associated with multiple source organizations. Different ones of the empirically successful computer security practices have been and/or are being used to prevent attacks and other vulnerabilities at different ones of the source organizations.

The received information can comprise rules used in an intrusion detection system or firewall to prevent attacks, rules used in a data loss prevention system to prevent the loss of data, anti-malware settings used to prevent infection, etc. Information concerning empirically successful computer security practices can be explicitly transmitted to the central computer by different specific source organizations. In addition or instead, information concerning empirically successful computer security practices on remote computers associated with specific source organizations can be read by the central computer. Computer security practices utilized by various ones of the source organizations can be monitored, and successful security practices can be inferred based on the results of utilizing the monitored computer security practices on the source organizations over time. Updated computer security practices can be periodically received (passively and/or actively) from the source organizations.

The information concerning empirically successful computer security practices received from the multiple source organizations is amalgamated and analyzed. Analyzing the amalgamated information can involve, for example, categorization based on the industry, type or size of the source organization. Based on the analysis, specific information concerning empirically successful computer security practices is identified to share with specific target organizations. This can involve identifying specific information concerning specific empirically successful computer security practices to be shared with specific target organizations based on industry, type and/or size of the organization, as well as specific computer security vulnerabilities to which the target organization is subject. Once information to share with a target organization has been identified, the information is anonymized, by removing any information that could explicitly or implicitly identify the originating source organization(s).

The identified specific information concerning empirically successful computer security practices is then provided to the specific target organizations, with the source identifying information removed. Thus, the target organizations do not receive information identifying the source organization(s) of the successful computer security practices. The information can be provided to the target organizations in a number of ways. For example, recommendations concerning computer security practices can be transmitted to target organizations, or target organization level security settings can be automatically updated.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
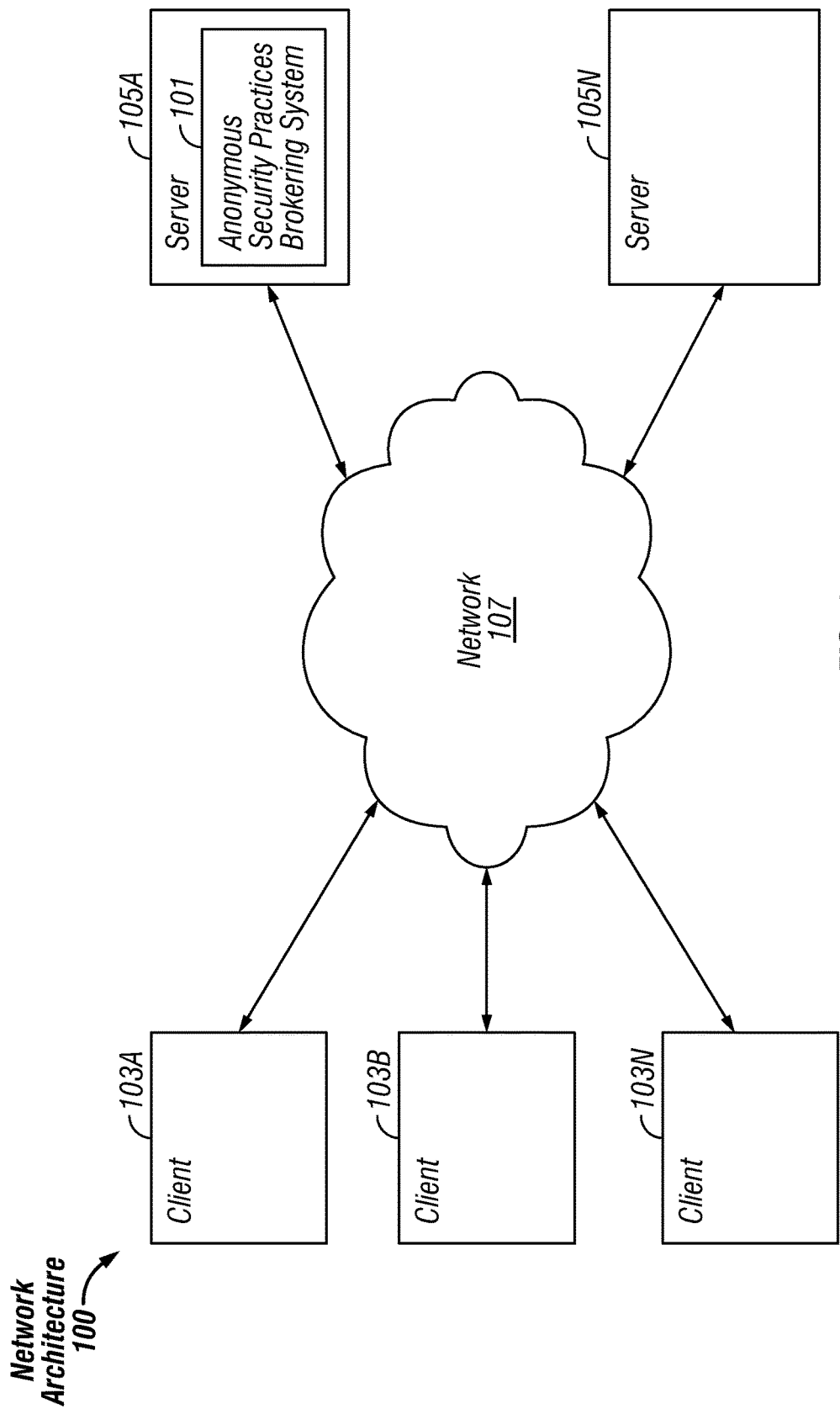
FIG. 1 is a block diagram of an exemplary network architecture in which an anonymous security practices brokering system can be implemented, according to some embodiments.

FIG. 1 is a block diagram illustrating an exemplary network architecture 100 in which an anonymous security practices brokering system 101 can be implemented. The illustrated network architecture 100 comprises multiple clients 103A, 103B and 103N, as well as multiple servers 105A and 105N. In FIG. 1, the anonymous security practices brokering system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and three servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
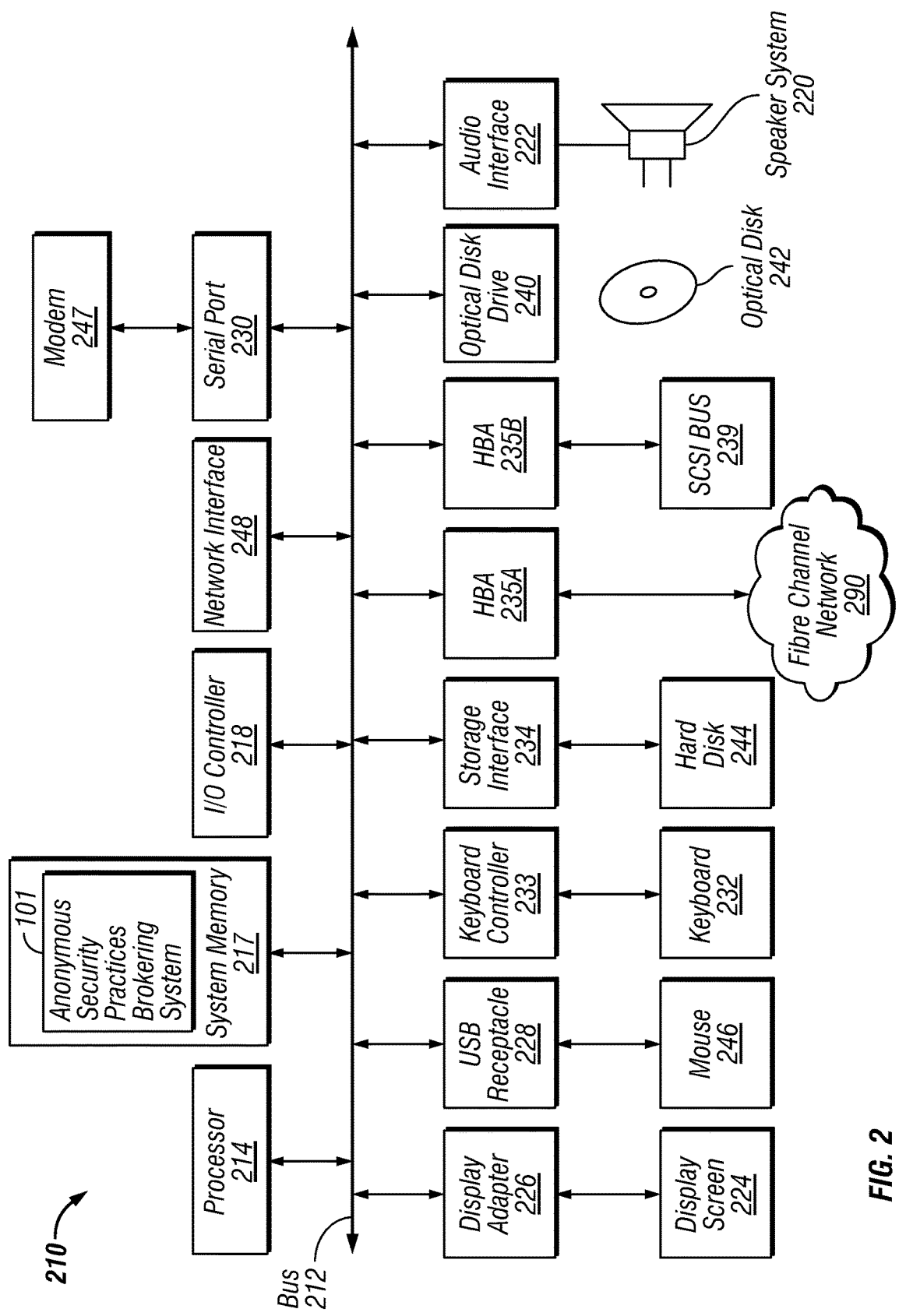
FIG. 2 is a block diagram of a computer system suitable for implementing an anonymous security practices brokering system, according to some embodiments.

FIG. 2 is a block diagram of a computer system 210 suitable for implementing an anonymous security practices brokering system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the anonymous security practices brokering system 101 is illustrated as residing in system memory 217. The workings of the anonymous security practices brokering system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
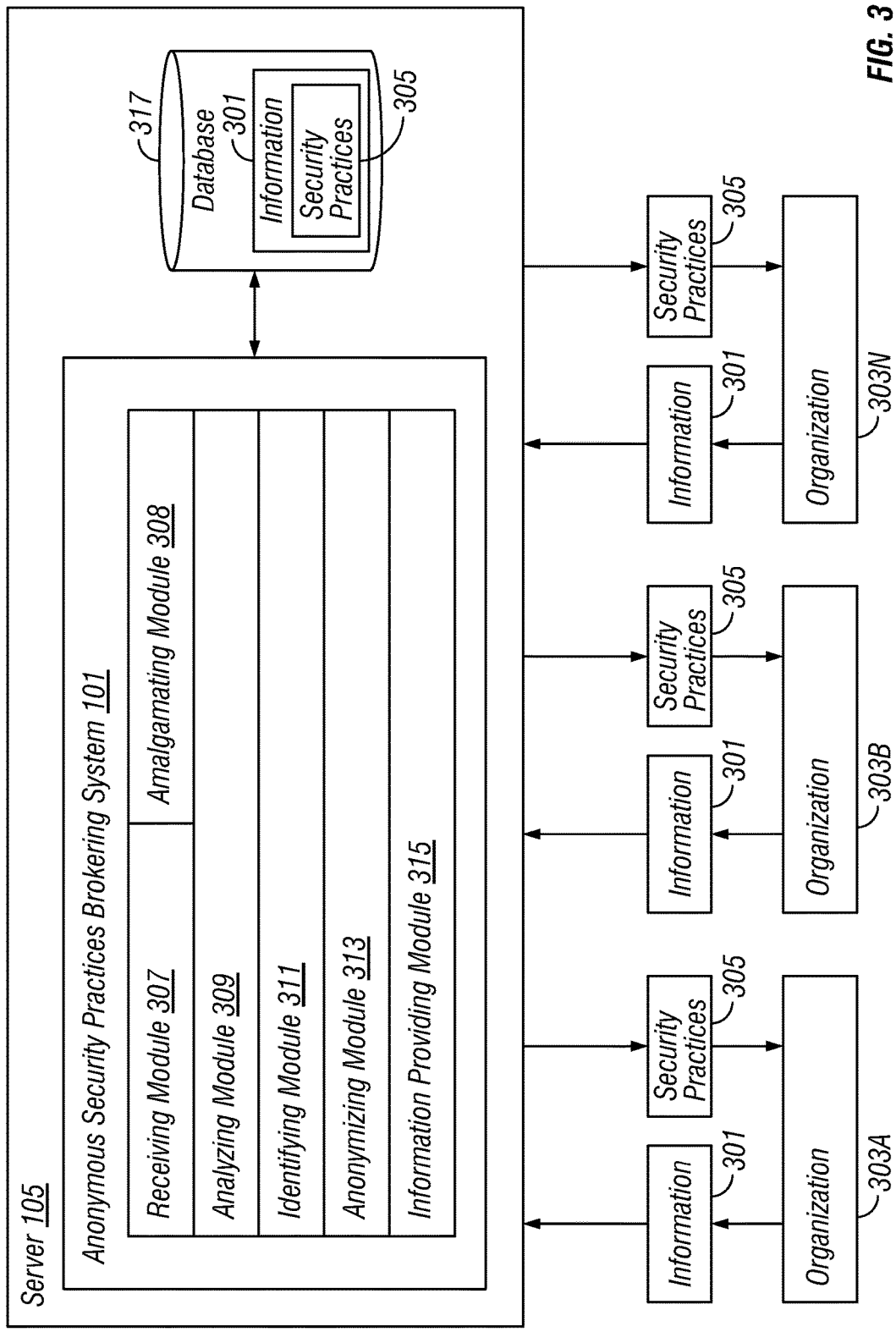
FIG. 3 is a high level block diagram of the operation of an anonymous security practices brokering system, according to some embodiments.

FIG. 3 illustrates an anonymous security practices brokering system 101 running on a server 105 in the cloud, and being accessed through a network 107 (e.g., the Internet) by computers 210 in multiple organizations. As described above, the functionalities of the anonymous security practices brokering system 101 can reside on specific computers 210 or be otherwise distributed between multiple computer systems 210, including within a fabric/cloud-based computing environment in which the functionality of the anonymous security practices brokering system 101 is provided as a service over a network 107. It is to be understood that although the anonymous security practices brokering system 101 is illustrated in FIG. 3 as a single entity, the illustrated anonymous security practices brokering system 101 represents a collection of functionalities, which can be instantiated as a single or multiple modules as desired (instantiation of a specific, multiple module anonymous security practices brokering system 101 is illustrated in FIG. 3). It is to be understood that the modules of the anonymous security practices brokering system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the anonymous security practices brokering system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates an anonymous security practices brokering system 101 running on a server 105, and functioning as a trusted third party broker for information 301 concerning successful computer security practices 305 from multiple organizations 303. In FIG. 3, three organizations 303A, 303B and 303N are illustrated exchanging computer security practice information 301 through the anonymous security practices brokering system 101. It is to be understood that when deployed in the field, the anonymous security practices brokering system 101 can interact with orders of magnitude more organizations 303 (e.g., hundreds, thousands, hundreds of thousands, etc.). As the term is used herein, an organization 303 can be any entity which maintains at least one networked computer 210 with administrated computer security infrastructure. One example of an organization 303 is a corporation or other commercial enterprise that maintains a professionally administered and secured computer network 107. Universities, government departments and other educational and/or not-for-profit institutions are other examples of organizations 303. An organization 303 can also be in the form of a small business, a private home network 107 or even an individual computer 210 connected to the Internet on which computer security infrastructure is installed (e.g., anti-malware software, a firewall, etc.).

As described in detail below, the anonymous security practices brokering system 101 enables secure sharing/crowdsourcing of computer security information 301. To achieve this, the anonymous security practices brokering system 101 amalgamates the information 301 received from the various organizations 303, analyzes the amalgamated information 301, identifies empirically successful practices 305 to share with specific target organizations $303_{TARGET}$, anonymizes the information 301 to protect the privacy and identity of the source organization(s) $303_{SOURCE}$, and provides identified successful computer security practices 305 to the target organizations $303_{TARGET}$. This results in the crowdsourcing of security practice information 301, and enables the sharing of best practices 305 in a secure and reliable fashion. The use of the anonymous security practices brokering system 101 enables IT professionals and other parties responsible for securing computer systems 210 to privately share their successful security practices 305 through a trusted third-party, and benefit from learning what practices 305 are working for other organizations 303. The anonymous security practices brokering system 101 itself becomes a security crowdsourcing broker platform, thereby adding value to the collected information 301, both by analyzing it and by identifying and anonymously sharing relevant successful security practices 305 with specific target organizations $303_{TARGET}$.

An information receiving module 307 of the anonymous security practices brokering system 101 receives information 301 concerning empirically successful computer security practices 305 from multiple source organizations $303_{SOURCE}$. IT administrators and other responsible parties at the level of the source organizations $303_{SOURCE}$ elect to provide or otherwise make available information 301 concerning computer security practices 305 that have been empirically successful for them. One example of such information 301 is specific rules that a given organization 303 has used in an intrusion detection system to successfully prevent one or more given attacks. Specific firewall rules used successfully to prevent attempted breaches are another example. Other examples include rules successfully used in a data loss prevention system by a source organization $303_{SOURCE}$ to prevent loss of data, and anti-malware system settings successfully used to prevent infection. It is to be understood that these are non-exhaustive examples, and in different embodiments different ones of the multiple source organizations $303_{SOURCE}$ can provide different types of information 301 relating to various security practices 305 that have been empirically successful for them in different contexts. In this manner, the anonymous security practices brokering system 101 is capable of collecting information 301 related to successful security best practices 305 from the various participating organizations 303.

In some instances, a given source organization $303_{SOURCE}$ explicitly transmits information 301 concerning empirically successful computer security practices 305 to the information receiving module 307 of the anonymous security practices brokering system 101. In other instances, the information receiving module 307 remotely reads or otherwise gleans this information 301, for example by reading settings within the computer security infrastructure (e.g., instruction detection system settings, anti-malware system settings, etc.) of the given source organization $303_{SOURCE}$. In these cases, an IT administrator or the like of the given source organization $303_{SOURCE}$ sets the relevant access permissions such that the information receiving module 307 can read the appropriate settings.

In one embodiment, the receiving module 307 monitors the use of various security practices 305 by one or more specific source organizations $303_{SOURCE}$ over time, and infers which security practices 305 are successful. In other words, the anonymous security practices brokering system 101 observes which computer security practices 305 work over time to achieve desired results on given organizations $303_{SOURCE}$ (e.g., an organization $303_{SOURCE}$ did X, Y and Z, and was never successfully attacked). Based on the results in practice of monitored source organizations $303_{SOURCE}$ utilizing various security practices 305, the anonymous security practices brokering system 101 infers which security practices 305 are successful, and receives information 301 from those source organizations $303_{SOURCE}$ in this way.

Despite the specific route by which information 301 arrives, the information receiving module 307 can receive (actively or passively) updated information 301 periodically, thereby maintaining current information from the various source organizations $303_{SOURCE}$. The frequency at which source organizations $303_{SOURCE}$ transmit (or at which the receiving module 307 actively gleans) updated information 301 is a variable design parameter, which can be set as desired according to different scenarios.

As part of or in addition to the information 301 concerning empirically successful computer security practices 305, the source organizations $303_{SOURCE}$ can provide, and the receiving module 307 can receive, various metadata comprising information such as the identity, size, industry, type or other factors describing the source organization $303_{SOURCE}$, which specific attacks/breaches/compromises different specific computer security practices 305 have been successful against, times of deployment of given computer security practices 305, information concerning the hardware/software configurations of the source organizations $303_{SOURCE}$, etc. The specific format and/or content of the information 301 concerning empirically successful computer security practices 305 originating from different source organizations $303_{SOURCE}$ is a variable design parameter.

An amalgamating module 308 of the anonymous security practices brokering system 101 amalgamates the information 301 received from the multiple source organizations $303_{SOURCE}$. This has the effect of maintaining a collection of information 301 concerning empirically successful computer security practices 305 received from each one of the multiple source organizations 303$_{SOURCE}$. A database 317 or other suitable information storage mechanism can be used to store and maintain the amalgamated information 301.

An analyzing module 309 of the anonymous security practices brokering system 101 analyzes the amalgamated information 301 concerning empirically successful computer security practices 305 received from the multiple source organizations 303$_{SOURCE}$. In one embodiment, this analysis can take the form of categorizing amalgamated information 301 based on the industry of the source organization 303$_{SOURCE}$ that provided it (e.g., software, electronics, financial services, retailing, automotive, etc.). The industry of the source organization 303$_{SOURCE}$ can be gleaned from the received information 301, in which it can be embedded explicitly, or from which it can be implicitly determined (e.g., from the name of organization 303, from the IP address from which the transmission originates, etc.). In other embodiments, information can be categorized based on the organization type from which it originated (e.g., publically traded corporation, privately held start-up, educational institution, government, home network, etc.) or the size thereof (e.g., more than 5000 computers, fewer than 100, individual user). Furthermore, the amalgamated information 301 can be minded according to various techniques, in order to extract additional usage and success patterns and other intelligence as desired.

An identifying module 311 of the anonymous security practices brokering system 101 identifies specific information 301 concerning empirically successful computer security practices 305 to share with specific target organizations 303$_{TARGET}$, based on the analysis of the amalgamated information 301. The matching of computer security practices 305 that were empirically successful for one or more source organizations 303$_{SOURCE}$ to specific target organizations 303$_{TARGET}$ can be performed at any level of granularity. For example, in one embodiment computer security practices 305 that have been empirically successful for source organizations 303$_{SOURCE}$ in a given industry (e.g., banking, military contracting, etc.) are identified as being desirable to share with target organizations 303$_{TARGET}$ that operate in the same industry (e.g., other banks, other military contractors, etc.). In another embodiment, computer security practices 305 that have worked well for specific types or sizes of source organizations 303$_{SOURCE}$ are identified for sharing with target organizations 303$_{TARGET}$ of the same type and/or size. Computer security practices 305 that have been empirically successful for specific types or sizes of source organizations 303$_{SOURCE}$ can also be identified for sharing with target organizations 303$_{TARGET}$ that are of a different type and/or size. For example, security practices 305 that have prevented attacks at large industrial organizations can be identified for sharing with small home networks and individuals. In other embodiments, computer security practices that have been empirically successful at protecting against specific computer security vulnerabilities (e.g., preventing specific attacks, types of attacks or other specific breaches or compromises of computer systems 210) can be identified for sharing with target organizations 303$_{TARGET}$ that are considered subject (e.g., vulnerable) to the given attack/breach/etc., based on, for example, geolocation, type of hardware or operating system, prevalence of the attack, etc.

Prior to sharing identified information 301 with target organizations 303$_{TARGET}$, an anonymizing module 313 of the anonymous security practices brokering system 101 anonymizes the shared information, by removing any information that explicitly and/or implicitly identifies any source organization 303$_{SOURCE}$. This information can include source organization 303$_{SOURCE}$ names, as well as any other information that could be used to identify any specific source organization 303$_{SOURCE}$ from which the computer security practices 305 being shared originated, such as physical or network address, etc. This enables source organizations 303$_{SOURCE}$ to be confident that their identities, as well what threats they have been subject to and other such information, including even the fact that they are participating in the program at all, will be kept confidential.

An information providing module 315 of the anonymous security practices brokering system 101 provides identified information 301 concerning empirically successful computer security practices 305 to specific target organizations 303$_{TARGET}$, with all information identifying the originating source organization(s) 303$_{SOURCE}$ removed. Thus, participating target organizations 303$_{TARGET}$ are able to benefit from receiving and utilizing information about best practices 305 for computer security as crowdsourced from the multiple participating organizations 303, thereby leveraging the experience and knowhow of a large group of IT administrators and other computer security professionals for protecting against threats. Because the organizations 303$_{TARGET}$ do not receive information identifying the source(s) of the provided information 301, the privacy and anonymity of the participants is maintained.

In one embodiment, providing information 301 concerning successful security practices 305 can take the form of transmitting recommendations to target organizations 303$_{TARGET}$. For example, the information providing module 315 can transmit alerts recommending to implement specific security practices 305, along with information describing how to do so. Such recommendations can be transmitted to, for example, an IT administrator or the like, or to a software system installed on the target 303$_{TARGET}$ which can in turn alert the responsible party.

In another embodiment, providing information 301 concerning successful security practices 305 can involve automatically updating or otherwise configuring settings on the target 303$_{TARGET}$. For example, the information providing module 315 can automatically modify or update settings, rulesets or the like on an intrusion detection system, firewall, anti-malware system, data loss prevention system or other tool present at the target organization 303$_{TARGET}$, in order to apply the empirically successful computer security practices there.

In some embodiments the same set of organizations 303 both provides and receives information 301 concerning successful computer security practices 305. In other embodiments, some organizations 303 receive information 301 concerning successful computer security practices 305 without themselves providing any (for example, for a fee). It is also possible for some organizations 303 to provide information 301 without receiving any themselves.

The anonymous security practices brokering system 101 enables anonymous sharing of computer security best practices 305. Organizations 303 tend to be very secretive about their IT operations, and are otherwise hesitant to share their successful security practices 305, even in return for receiving those of other organizations 303. By serving as a trusted third party, the anonymous security practices brokering system 101 provides this functionality as a cloud service in a secure fashion. Crowdsourcing security best practices 305 adds value for all receiving organizations 303, especially so for parties in the same or adjacent industries. The anonymous security practices brokering system 101 enables such organizations 303 to benefit from the knowledge obtained by their competitors from having successfully responded to computer security incidents that they experienced, without revealing the identity of the specific sources $303_{SOURCE}$ of any shared information 301.

Figure 4:
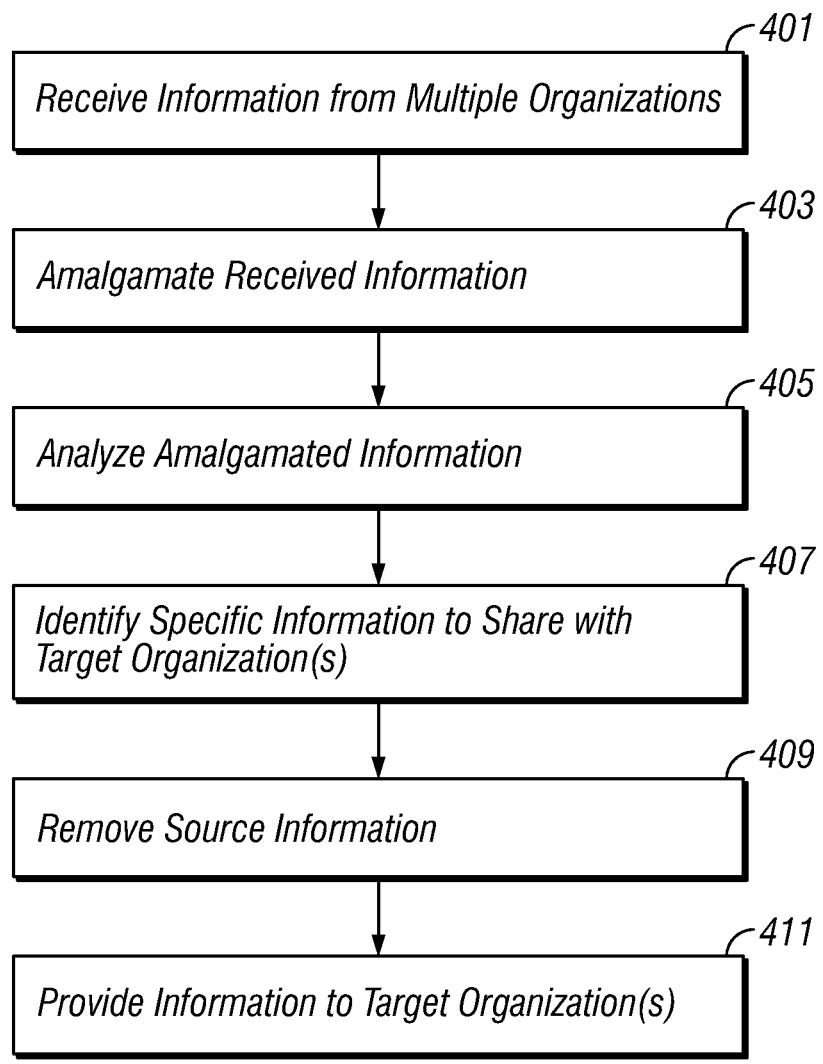
FIG. 4 is a flow chart of the steps an exemplary method of the operation of an anonymous security practices brokering system, according to some embodiments.

FIG. 4 illustrates steps performed during the operation of an anonymous security practices brokering system 101, according to some embodiments. The information receiving module 307 receives 401 information 301 concerning empirically successful computer security practices 305 from multiple remote computers 210 associated with multiple source organizations $303_{SOURCE}$. The amalgamating module 308 amalgamates 403 the information 301 concerning empirically successful computer security practices 305 received from the multiple remote computers 210 associated with the multiple source organizations $303_{SOURCE}$. The analyzing module 309 analyzes 405 the amalgamated information 301 concerning empirically successful computer security practices 305. The identifying module 311 identifies 407 specific information 301 concerning empirically successful computer security practices 305 to share with specific target organizations $303_{TARGET}$, based on the analysis of the amalgamated information 301. The anonymizing module 313 removes 409 explicit and/or implicit source information from the identified information 301 concerning empirically successful computer security practices 305 to be shared with the specific target organizations $303_{TARGET}$. The information providing module 315 provides 411 the identified specific information 301 concerning empirically successful computer security practices 305 to the specific target organizations $303_{TARGET}$, with the explicit and/or implicit source information removed.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for a trusted third party broker to collect information concerning successful computer security practices from a plurality of source organizations, and to share collected information at an inter-organizational level privately, the method comprising the steps of:
receiving, by a central computer, information concerning empirically successful computer security practices, from a plurality of remote computers associated with a plurality of source organizations, wherein different ones of the empirically successful computer security practices are being used at different ones of the plurality of source organizations;
amalgamating the information concerning empirically successful computer security practices received from the plurality of remote computers associated with the plurality of source organizations, further comprising gleaning implicitly determined information about at least one of the plurality of source organizations of the received information;
analyzing the amalgamated information concerning empirically successful computer security practices received from the plurality of remote computers associated with the plurality of source organizations, further comprising categorizing the amalgamated information based on the implicitly determined information about the at least one source organization;
identifying specific information concerning empirically successful computer security practices to share with at least one specific target organization, based on analyzing category granularity of the amalgamated information;
removing source information from the identified specific information concerning empirically successful computer security practices to share with the at least one specific target organization; and
providing the identified specific information concerning empirically successful computer security practices to share with the at least one specific target organization, with the source information removed, wherein the at least one target organization does not receive information identifying the source of the provided information concerning empirically successful computer security practices.

2. The method of claim 1 wherein receiving information concerning empirically successful computer security practices further comprises:
receiving, by the central computer, rules used in an intrusion detection system by at least one specific source organization to prevent at least one attack, from at least one remote computer.

3. The method of claim 1 wherein receiving information concerning empirically successful computer security practices further comprises:
receiving, by the central computer, rules used in a firewall by at least one specific source organization to prevent at least one attack, from at least one remote computer.

4. The method of claim 1 wherein receiving information concerning empirically successful computer security practices further comprises:
receiving, by the central computer, rules used in a data loss prevention system by at least one specific source organization to prevent loss of data, from at least one remote computer.

5. The method of claim 1 wherein receiving information concerning empirically successful computer security practices further comprises:
receiving, by the central computer, settings used in an anti-malware system by at least one specific source organization to prevent infection, from at least one remote computer.

6. The method of claim 1 wherein receiving information concerning empirically successful computer security practices further comprises:
receiving, by the central computer, information concerning empirically successful computer security practices explicitly transmitted to the central computer by at least one specific source organization.

7. The method of claim 1 wherein receiving information concerning empirically successful computer security practices further comprises:

reading, by the central computer, information concerning empirically successful computer security practices on at least one remote computer associated with at least one specific source organization.

8. The method of claim 1 wherein receiving information concerning empirically successful computer security practices further comprises:
monitoring, by the central computer, computer security practices utilized by the plurality of source organizations; and
inferring successful security practices based on results of utilizing the monitored computer security practices by the plurality of source organizations over time.

9. The method of claim 1 wherein receiving information concerning empirically successful computer security practices further comprises:
receiving, by the central computer, updated computer security practices utilized by the plurality of remote computers associated with the plurality of source organizations over time.

10. The method of claim 1 further comprising:
categorizing amalgamated information concerning empirically successful computer security practices based on industry.

11. The method of claim 1 further comprising:
identifying specific information concerning empirically successful computer security practices to share with at least one specific target organization based on industry.

12. The method of claim 1 further comprising:
categorizing amalgamated information concerning empirically successful computer security practices based on type of organization.

13. The method of claim 1 further comprising:
identifying specific information concerning empirically successful computer security practices to share with at least one specific target organization based on type of organization.

14. The method of claim 1 further comprising:
identifying specific information concerning empirically successful computer security practices to share with at least one specific target organization based on size of organization.

15. The method of claim 1 further comprising:
identifying specific information concerning empirically successful computer security practices to share with at least one specific target organization based on at least one specific computer security vulnerability which the identified security practices have been empirically successful protecting against for at least one source organization.

16. The method of claim 1 further comprising:
identifying specific information concerning empirically successful computer security practices to share with at least one specific target organization based on at least one specific computer security vulnerability to which the at least one specific target organization is subject.

17. The method of claim 1 wherein providing the identified specific information concerning empirically successful computer security practices to the at least one specific target organization further comprises:
transmitting, by the central computer, at least one recommendation concerning computer security practices to the at least one specific target organization.

18. The method of claim 1 wherein providing the identified specific information concerning empirically successful computer security practices to the at least one specific target organization further comprises:
automatically updating, by the central computer, security settings of at least one remote computer associated with the at least one specific organization.

19. At least one non-transitory computer readable medium for a trusted third party broker to collect information concerning successful computer security practices from a plurality of source organizations, and to share collected information at an inter-organizational level privately, the at least one non-transitory computer readable medium storing computer executable instructions that, when loaded into computer memory and executed by at least one processor of at least one computing device, cause the at least one computing device to perform the following steps:
receiving information concerning empirically successful computer security practices, from a plurality of remote computers associated with a plurality of source organizations, wherein different ones of the empirically successful computer security practices are being used at different ones of the plurality of source organizations;
amalgamating the information concerning empirically successful computer security practices received from the plurality of remote computers associated with the plurality of source organizations, further comprising gleaning implicitly determined information about at least one of the plurality of source organizations of the received information;
analyzing the amalgamated information concerning empirically successful computer security practices received from the plurality of remote computers associated with the plurality of source organizations, further comprising categorizing the amalgamated information based on the implicitly determined information about the at least one source organization;
identifying specific information concerning empirically successful computer security practices to share with at least one specific target organization, based on analyzing category granularity of the amalgamated information;
removing source information from the identified specific information concerning empirically successful computer security practices to share with the at least one specific target organization; and
providing the identified specific information concerning empirically successful computer security practices to share with the at least one specific target organization, with the source information removed, wherein the at least one target organization does not receive information identifying the source of the provided information concerning empirically successful computer security practices.

20. A computer system for a trusted third party broker to collect information concerning successful computer security practices from a plurality of source organizations, and to share collected information at an inter-organizational level privately, the computer system comprising:
a processor;
system memory;
an information receiving module residing in the system memory, the information receiving module being programmed to receive information concerning empirically successful computer security practices, from a plurality of remote computers associated with a plurality of source organizations, wherein different ones of the empirically successful computer security practices are being used at different ones of the plurality of source organizations;

an amalgamating module residing in the system memory, the amalgamating module being programmed to amalgamate the information concerning empirically successful computer security practices received from the plurality of remote computers associated with the plurality of source organizations, and glean implicitly determined information about at least one of the plurality of source organizations of the received information;

an analyzing module residing in the system memory, the analyzing module being programmed to analyze the amalgamated information concerning empirically successful computer security practices received from the plurality of remote computers associated with the plurality of source organizations, and categorize the amalgamated information based on the implicitly determined information about the at least one source organization;

an identifying module residing in the system memory, the identifying module being programmed to identify specific information concerning empirically successful computer security practices to share with at least one specific target organization, based on analyzing category granularity of the amalgamated information;

an anonymizing module residing in the system memory, the anonymizing module being programmed to remove source information from the identified specific information concerning empirically successful computer security practices to share with the at least one specific target organization; and an information providing module residing in the system memory, the information providing module being programmed to provide the identified specific information concerning empirically successful computer security practices to share with the at least one specific target organization, with the source information removed, wherein the at least one target organization does not receive information identifying the source of the provided information concerning empirically successful computer security practices.

* * * * *